Figure 1:
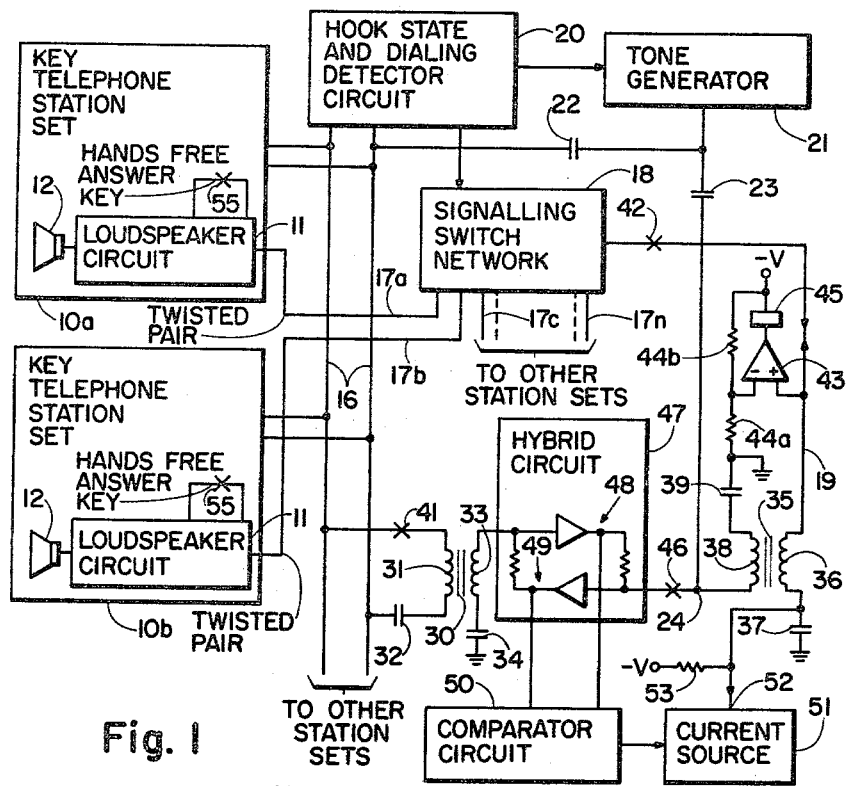

United States Patent [19]

Gibb et al.

[11] 4,293,740
[45] Oct. 6, 1981

[54] HANDS FREE ANSWER INTERCOM

[75] Inventors: William D. Gibb; Donald E. Clement, both of Belleville, Canada

[73] Assignee: Northern Telecom Limited, Montreal, Canada

[21] Appl. No.: 180,882

[22] Filed: Aug. 25, 1980

[51] Int. Cl.[3] .......................... H04M 1/60; H04M 9/10
[52] U.S. Cl. .............................. 179/99 A; 179/1 HF; 179/81 B
[58] Field of Search ................ 179/99 A, 1 HF, 81 B, 179/100 L, 1 VC, 1 H, 37, 18 AB

[56] References Cited

U.S. PATENT DOCUMENTS

| | | | |
|---|---|---|---|
| 3,881,069 | 4/1975 | Ichikawa et al. | 179/81 B |
| 3,898,392 | 8/1975 | Jackson | 179/99 A |
| 3,904,834 | 9/1975 | Shinoi et al. | 179/99 A |
| 3,976,847 | 8/1976 | Bidlack et al. | 179/99 A |
| 3,979,563 | 9/1976 | Kita et al. | 179/99 A |
| 4,025,728 | 5/1977 | Jacobson | 179/81 B |
| 4,101,735 | 7/1978 | Bridenbaugh | 179/1 HF |
| 4,158,112 | 6/1979 | Cerbone et al. | 179/99 A |
| 4,175,216 | 11/1979 | Kita et al. | 179/99 A |

Primary Examiner—Gerald L. Brigance
Attorney, Agent, or Firm—J. E. Moorhouse

[57] ABSTRACT

A hands free answer feature is provided in a key telephone system which includes an intercom lead pair for providing intercommunication between key telephone station sets and a signalling path for providing audible signals via a loudspeaker circuit in the key telephone station sets. The hands free intercom feature is provided by the addition of a hybrid circuit including first and second unidirectional signal paths for coupling a.c. signals between the intercom lead pair and the signalling lead. A d.c. control signal having first and second d.c. signal states is generated on the signalling lead in response to a ratio of amplitudes of signals in the first and second signal paths being greater or lesser than a predetermined ratio. The loudspeaker circuits each include a receive signal path connected to a loudspeaker. A transmit path and path switching circuitry are added to the loudspeaker circuit. The path switching circuitry is responsive to the first and second states of the d.c. control signal to alternately activate one and the other of the transmit and receive signal paths whereby the hands free answer intercom feature is provided.

10 Claims, 2 Drawing Figures

HANDS FREE ANSWER INTERCOM

The invention is in the field of hands free telecommunication and more particularly relates to a hands free intercom circuit for providing a hands free answer mode of operation in a communication system.

Key telephone systems offer a distinct economical advantage in the area of small telephone systems. This advantage is inherent in the structure of these systems. The structure is such that the cost of the system is substantially linear with respect to size. The cost is generally determined on a per line, per telephone basis. Similarly service features in addition to ordinary key telephone service add to the cost on a feature per line, per telephone basis. Hence additional service features must be provided with strict economy. Otherwise the key telephone system tends to be less cost competitive.

One of the desirable operating features in a telephone system adapted to a business environment is that known in the telephony art as hands free telephony. The advantage of this features is that conversation is accomplished without the use of a telephone handset, such that the telephone user is free to move about and use both hands during communication with a remote party. The hands free feature can be provided by connecting a loudspeaking communication terminal apparatus in combination with a telephone station set. One example of a loudspeaking communication terminal is that available under the trademark Companion. The Companion however includes circuitry designed to operate optimally over a broad range of conditions as found in the telephone system in general.

One of the features typically characterizing a key telephone system is an intercom feature. The intercom feature permits users of key telephone station sets to be in direct communication with one another by way of an intercom path provided by a local intercom lead pair. The local intercom lead pair if routed through the key telephone system so as to be accessible by various of the key telephone station sets as required. The intercom path is separate from any central office facility and includes associated circuitry for generating and routing appropriate signalling tones in response to supervisory states of the intercom lead pair and in response to dialling signals. Intercom call ringing signals are typically generated in the form of tone signals audibly producable by a loudspeaker in the called key telephone station set. In one arrangement a calling party is optionally permitted to voice page the called party. This feature is provided by means of a switch for connecting the local intercom pair to the associated routing circuitry, whereby a one-way voice path is established from the key telephone station set transmitter of the calling party to the loudspeaker in the called party station set, whereby the loudspeaker reproduces the calling party's voice. Intercom features as described in the foregoing have proven to be very popular and useful in key telephone systems. The intercom feature is further enhanced with the addition of hands free telephone apparatus, for example the previously mentioned Companion apparatus. However, the additional expense is substantial.

It is an object of the invention to improve an intercom communication facility by providing a hands free mode of operation such that a called party may converse with the calling party by way of the loudspeaker in the called party's station set. In a key telephone system, hands free answer circuitry is combined with existing intercom circuitry and signalling circuitry in a common portion of the system, and also in individual associated key telephone station sets.

In accordance with the invention a hands free answer intercom circuit is provided in combination with a key telephone system which includes a pair of intercom leads for carrying voice band signals, a signalling lead, and a plurality of key telephone station sets. Each of the telephone station sets includes a loudspeaker circuit for connection with the signalling lead and a handset for providing voice band communication with the other key telephone station sets via the pair of intercom leads. The hands free intercom circuit comprises a hybrid coupling circuit including a first unidirectional signal path for coupling first a.c. voice band signals from the pair of intercom leads to the signalling lead and a second unidirectional signal path for coupling second a.c. voice band signals from the signalling lead to the pair of intercom leads. A control circuit is responsive to the ratio of the amplitude of the first and second a.c. voice band signals from the hybrid circuit being greater or lesser than a predetermined ratio to generate a d.c. control signal of alternately first and second d.c. signal states in the signalling lead. The first a.c. signals and the d.c. control signal are accordingly provided on the signalling lead for use by one of the key telephone station sets connected thereto.

Also in accordance with the ivnention a hands free answer intercom circuit is provided in combination with a key telephone station set which includes a receive signal path for receiving voice band signals from a signalling lead and for coupling the received voice band signals to a loudspeaker. The hands free intercom circuit comprises a transmit signal path for receiving voice band signals from the loudspeaker for transmission to the signalling lead. A switch means alternately completes the receive signal path and the transmit signal path in series connection with the loudspeaker in response to a d.c. control signal on the signalling lead being respectively of first and second d.c. signal states, whereby the key telephone station set is caused to operate in a transmit mode and in a loudspeaking receive mode.

A method of operating a key telephone system to provide a hands free answer function in accordance with the invention utilizes an intercom lead pair and a signalling path in the key telephone system and a loudspeaker circuit in a called key telephone station set. The method comprises the steps of coupling a.c. signals between the intercom lead pair and the signalling path via a hybrid circuit having first and second unidirectional signal paths. A d.c. control signal is generated on the signalling path. The d.c. control voltage is generated with first and second d.c. signal states in response to a ratio of amplitudes of the a.c. signals in the first and second unidirectional signal paths being greater or lesser than a predetermined ratio. The loudspeaker circuit is operated in a transmit mode wherein a.c. signals originating in the loudspeaker circuit are transmitted to the intercom lead pair via the signalling path and the hybrid circuit in response to the d.c. control signal being of the first d.c. signal state. The loudspeaker circuit is operated in a receive mode wherein a.c. signals from a handset in a calling key telephone station set are transmitted via the intercom lead pair, the hybrid circuit and the signalling path for audible reproduction at the called key telephone station set, in response to the d.c. control signal being of the second d.c. signal state.

Figure 2:
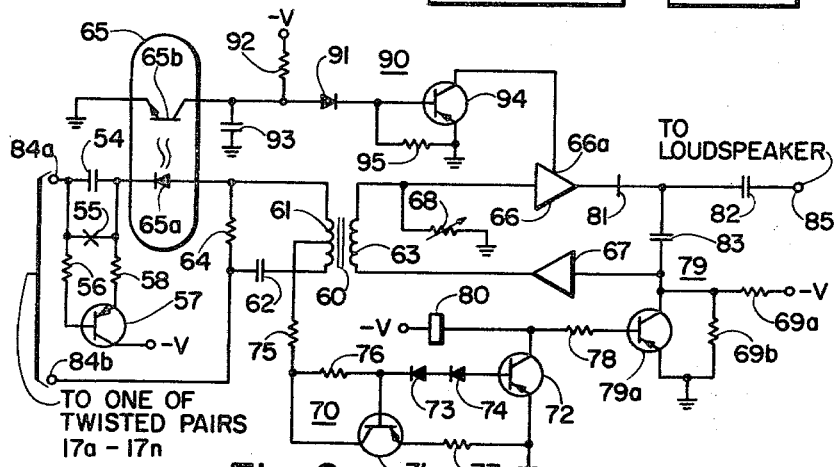

An example embodiment will now be described with reference to the accompanying drawings in which:

FIG. 1 is a block schematic diagram of a key telephone system including circuitry for providing a hands free answer intercom feature in accordance with the invention; and FIG. 2 is a schematic diagram of a loudspeaker circuit used in a key telephone station set illustrated in FIG. 1.

The structure and operation of the example embodiment will become apparent in the following functional description of the drawings. In the following description, and with reference to FIG. 1, a typical intercom feature in the key telephone system is first described. Thereafter and with reference to FIGS. 1 and 2 the hands free answer intercom feature in the key telephone system is described.

Referring to FIG. 1, the key telephone system is illustrated to show the structure as it relates to the intercom feature and the hands free intercom answer feature in the system. The key telephone system includes a plurality of key telephone station sets 10a–10n, of which key telephone station sets 10a and 10b are shown. Each key telephone station set includes a loudspeaker circuit 11 connected to a loudspeaker 12. The basic function of the loudspeaker circuit 11 is to amplify signalling, for example intercom ringing signals, for audible production by the loudspeaker 12. As will be described later, the loudspeaker circuit 11 also may function as a microphone amplifier. Each of the key telephone station sets 10 is associated with a plurality of communication lead pairs of which an intercom lead pair 16 is shown. Each of the key telephone station set 10a–10n will normally include a handset, a hook switch, a dialling device and various switch keys including an intercom key not shown, for its normal operation in the system. The intercom lead pair 16 is connected to a hook state and dialling detector circuit 20 which supplies the intercom lead pair with operating current. The hook state and dialling detector circuit 20 also supplies control signals to a tone generator 21 and to a signalling switch network 18. When one of the key telephone station sets for example 10a goes OFF HOOK with its intercom key depressed, it is connected to the intercom lead pair and receives energizing current therefrom. A line relay not shown, in the detector circuit 20 operates in response to the flow of energizing current causing the control signals to be generated. The tone generator 21 is responsive to the control signals to generate appropriate tone signals audible to the user of a key telephone station set during the progress of an intercom call. The tone signals are conducted to the calling key telephone station set via a capacitor 22 and the lead pair 16 for receipt at the handset. The called party is identified by dialled digits detected by the hook state and dialling detector circuit 20. Dialling information is transferred to the signalling switch network which accordingly provides a path via one of lead pairs 17a–17n to the called key telephone station set for carrying tone signals to the loudspeaker circuit 11 therein. Any one of the key telephone station sets 10a–10n actively connected with the lead pair 16 and going OFF HOOK increases the energizing current on the lead pair 16. This increase is detected by the hook state and dialling detector circuit 20 which causes the tone generator 21 to be accordingly deactivated and the signalling path in the signalling switch network 18 to be severed. Conversation between the two OFF HOOK key telephone station sets proceeds in a normal manner via the intercom lead pair 16.

The preceding description has briefly illustrated the structure and function of a typical key telephone system operated in an intercom mode. The description following is directed to additional structure in combination with a typical key telephone system for providing the intercom hands free answer feature in the key telephone system.

The intercom hands free feature is provided by a hybrid circuit 47 added between the intercom lead pair 16 and the signalling switch network 18. By this means, voice signals are transferable between the intercom lead pair 16 and a called key telephone set 10 via the signalling switch network 18 and the loudspeaking circuit 11. A comparator circuit 50 responds to signals in the hybrid circuit 47 by controlling a current source 51 to generate control signals for controlling a loudspeaker circuit 11 similar to that illustrated in FIG. 2, to yield transmit and receive functions.

It should be noted that as the previously described signalling paths are now used for three functions, the first being the previously described function of signalling, the second being the transmission of voice for the hands free answer function, and the third being the transmission of the control signals for the receive and transmit modes of operation of the loudspeaker circuit 11.

Referring to FIG. 1 in more detail, one side of the hybrid circuit 47 is coupled to the intercom lead pair 16 via a coupling transformer 30, a capacitor 32 and a make contact 41. The coupling transformer 30 includes a winding 31 connected between the make contact 41 and the capacitor 32, and a winding 33 connected between the hybrid circuit 47 and ground via a capacitor 34. The other side of the hybrid circuit 47 is connected to a junction 24 by a make contact 46. The output of the tone generator 21 is also connected to the junction 24 by a capacitor 23. A signalling lead 19 is coupled by a coupling transformer 35 to carry voice band signals and the control signals. A relay contact 42 is connected in series with the signalling lead 19 and one end of a winding 36 in the coupling transformer 35. The other end of the winding 36 terminates at a junction of a capacitor 37, a resistor 53 and an output 52 of the current source 51. The coupling transformer 35 also includes a winding 38 connected in series with a capacitor 39 between ground and the junction 24. Each of the capacitors 23, 32, 34, 37 and 39 provide for d.c. blocking. The relay contacts 41 and 42 areassociated in operation with the line relay previously mentioned as residing in the hook state and dialling detector circuit 20. The make contact 46 is associated with a relay 45. The relay 45 is connected in series with an output of a differential amplifier 43. The differential amplifier 43 includes a non-inverting input connected to the lead 19 and an inverting input connected to the junction of resistors 44a and 44b, which are connected in series between ground and a voltage terminal −V. Each of the key telephone station sets includes a hands free answer switch key 55 which in a called one of the key telephone station sets becomes connected to the lead 19 via an associated one of the lead pairs 17a–17n and the signalling switch network 18. Depression of the hands free answer switch key 55 maintains d.c. voltage on the lead 19 more positive than the potential at the junction of the resistor 44a and 44b. The differential amplifier correspondingly causes the relay 45 to operate, making contact between the hybrid circuit 47 and the junction 24 via the make contact 46. With the handset in the calling key telephone station set OFF HOOK, the line relay is operated causing the make contacts 41 and 42 to be closed. As previously described, dialled digits cause the signalling switch network to establish a communication path to the dialled one of the remaining key telephone station sets. Voice signals from the calling party's handset are transmitted via a communication path which includes the intercom leads 16, the transformer 30, a first signal path 48 in the hybrid circuit 47, the coupling transformer 35 and on one of the selected leads 17a–17n to the called key telephone station set. At the same time a d.c. current of about 1 milliamp is conducted to the voltage terminal −V through the resistor 53 and the winding 36. This current is drawn from the loudspeaker circuit 11 in the called key telephone set to effect control of same as will be described later. Voice band signals from the loudspeaker circuit 11 are likewise conducted over the established communication path and are passed by a second signal path 49 in the hybrid circuit 47 to the intercom lead pair 16 for audible reproduction in the calling party's handset. The comparator circuit 50 is connected to switch the current source 51 OFF in response to the ratio of a.c. signal amplitude in the first signal path 48 to a.c. signal amplitude in the second signal path 49 being at least greater than 1. In the absence of voice band signals in the first signal path 48, the comparator circuit 50 permits the current source 51 to draw about 3 milliamps from the established communication path. This current causes the called key telephone station set loudspeaking circuit 11 to be in a transmit mode of operation as will be described later. In the event that voice signals from the calling party handset transmitted on the first signal path 48 exceed signals in the second signal path 49, the comparator circuit 50 causes the current source 51 to switch OFF. The current in the communication path is correspondingly reduced, causing the called party's loudspeaker circuit 11 to operate in a receive mode. When the called key telephone station set goes OFF HOOK, a normal intercom connection is established over the intercom lead pair 16 and the hands free answer feature is no longer required. In this event, in the hook state and dialling detector circuit 20 responds to increased current on the intercom lead pair 16 to release the hybrid circuit 47 by opening the contacts 41 and 42. At the same time the signalling switch network 18 is caused to sever the previously established communication path.

The loudspeaker circuit in FIG. 2 is responsive to direct current, supplied via the winding 36 in FIG. 1, to operate in the receive mode and when the hands free answer switch key 55 is depressed, to operate alternately in the receive and transmit modes. The loudspeaker circuit includes a signal terminal 84a and a common ground terminal 84b for connection across one of the twisted pairs 17a–17n in FIG. 1, and a speaker terminal 85 for connection to the loudspeaker 11. The line terminal 84b provides for a ground return to a common ground in the signalling switch network for voice band signals received at the signal terminal 84a. Briefly in operation in the key telephone system, a negative voltage approaching the potential at the voltage terminal −V or a d.c. signal of about 1 milliamp at the signal terminal 84a causes the loudspeaker circuit to operate in a receive mode. A photocoupler 65 activates a switch generally shown at 90 which in turn activates a power amplifier 65 in a receive path. Voice band signals received at the signal terminal 84a are coupled via a diode 65a, in the photocoupler 65, and a transformer 60 to the power amplifier 66. The power amplifier 66 produces an amplified signal at its output. The amplified signal is coupled through a first transmission gate provided by a break contact 81, to the speaker terminal 85 via a capacitor 82, for reproduction by the loudspeaker 12. When the d.c. signal is supplied by the current source 53 in FIG. 1 and the hands free answer key 55 is depressed, the current through the diode 65a is increased by about 3 milliamp to a higher level or second state causing the loudspeaker circuit to operate in a transmit mode. The increased current activates a switch generally indicated at 70. The switch 70 causes the break contact 81 to operate, severing the output of the power amplifier 66. At the same time an amplifier 67 in a transmit path is biased by a second transmission gate generally at 79, to amplify signals from the loudspeaker terminal 85. These amplified signals are transmitted from the output of the amplifier 67 via the transformer 60 and the photocoupler 65 to the line terminal 84a for receipt by the calling party. Of course when the hands free answer switch key 55 is not depressed, the transmit mode is prohibited.

Considering the loudspeaker circuit illustrated in FIG. 2 in more detail, the hands free answer key 55 is connected in parallel with a capacitor 54 between the signal terminal 84a and the diode 65a. A resistor 56 is connected between the signal terminal 84a and a base electrode of a PNP transistor 57. A collector electrode of the transistor 57 is connected to the voltage terminal −V. A resistor 58, similar in ohmic value to the resistor 53 in FIG. 1 is connected between an emitter electrode of the transistor 57 and the diode 65a. When the hands free answer key 55 is released the loudspeaker circuit is sensitive to d.c. voltage at the signal terminal 84a. Voice band signals are bypassed by the capacitor 54. In the event that current is drawn by the resistor 53 or the current source 51 in FIG. 1, the d.c. potential at the signal terminal 84a approaches that of the potential at the voltage terminal −V. In this case the transistor 57 switches ON causing the resistor 58 and the diode 65a to conduct about 1 milliamp of direct current. When the hands free answer switch key is depressed, the loudspeaker circuit is sensitive to direct current at the signal terminal 84a. In a quiescent state substantially no direct current is conducted by the diode 65a. In this condition, a transistor 65b in the photocoupler is maintained OFF. A negative potential is supplied from the negative voltage terminal −V via a resistor 92 to a junction of a collector electrode of the transistor 65b, a capacitor 93 and an anode of a Zener diode 91. Current is conducted via the resistor 92, the Zener diode 91 and a parallel combination of a resistor 95 and a base emitter junction of a transistor 94. The transistor 94 is thereby switched ON, to provide a ground path at a control input 66a of the power amplifier 66. In one example the power amplifier consists of an integrated circuit number LM380, wherein the control input 66a corresponds to a "bypass" terminal. In this state the output of the power amplifier is clamped, and no a.c. voltage signals appear at the terminal 85.

The loudspeaker circuit is activated by at least a milliamp of direct current being conducted via the diode 65a. In this case the transistor 65b is ON and provides a current path for all the current conducted by the resistor 92. Consequently, the transistor 94 is now OFF and the power amplifier 66 is operational to amplify signals appearing at its input. The capacitor 93 performs a filtering function so that any noise spikes in the direct current do not affect the operation of the switch 90.

The direct current passing through the diode 65a also passes through a parallel combination of a resistor 64 and the switch 70 which has an input connected to a centertap of a winding 61 in the transformer 60. However the switch 70 is substantially quiescent in the presence of a d.c. control signal of less than about 3 milliamps. In the presence of a 1 milliamp d.c. control signal, current is conducted from ground through a resistor 77 to an emitter electrode of a transistor 71. A small portion of the current is conducted via a base electrode of the transistor 71 and a resistor 76 to a resistor 75. The remaining portion is conducted via a collector electrode of the transistor 71 to the resistor 75. The resistor 75 conducts the current to the centertap of the winding 61, and so on. When the d.c. control signal increases by 3 milliamps, the loudspeaker circuit is required to switch to the transmit mode. Current conducted by the resistor 77 increases and the voltage drop across the resistor 77 becomes sufficient to cause a portion of the current to flow by an alternate path consisting of three PN junctions. The PN junctions are povided by a base emitter junction of a transistor 72 connected in series with diodes 73 and 74. When this happens the transistor 72 is turned ON, with its collector electrode conducting current from the voltage terminal −V via a relay 80. This causes the associated break contact 81 to operate and also causes a transistor 79, previously ON, to be turned OFF as there is no longer any bias current available to its base electrode via a resistor 78. The transistor 79 being OFF now permits a bias voltage to be established at the input of the amplifier 67 by resistors 69a and 69b. This also permits coupling of a.c. signals from the terminal 85 via the capacitor 82 and a capacitor 83 to the input of the amplifier 67. These signals are amplified and coupled through the transformer 60 to the signal terminal 84a.

The loudspeaker circuit considered from the viewpoint of a.c. signal function has three different configurations, two being the transmit and receive states and the third being a dormant state. In the dormant state it is required that essentially no excitation of the loudspeaker should occur. Referring to FIG. 1 for a moment, in the dormant state, the line terminal of the loudspeaker circuit 11 is connected to one of the leads 17 which by virtue of the nature of the switching signal network 18 is disconnected from the system. In this state, the lead 17 connected to terminal 84 in FIG. 2 is from time to time likely to have noise signals induced upon it. However as there is no direct current conducted by the photocoupler 65, the power amplifier 66 as before described is effectively deactivated to maintain the loudspeaker silent.

In the receive state, which occurs in the presence of about 1 milliamp of the d.c. control signal with the hands free answer switch key 55 depressed or in the presence of a negative voltage with the hands free answer key 55 released, a.c. signals are induced from the winding 61 into the winding 63. As the transistor 79 is ON, the input of the amplifier 67 is clamped near ground. Accordingly an a.c. ground appears at its output and completes a circuit for the a.c. signals supplied from the winding 63 to the input of the power amplifier 66. A variable resistor 68 provides a shunt volume control function. As the transistor 94 is OFF, the power amplifier 66 amplifies the a.c. signals. The amplified a.c. signals are coupled via the break contact 81, the capacitor 82 and the speaker terminal 85 to the loudspeaker 12. In one example, a loudspeaker having a 50 ohm voice with impedance is adequately coupled with a capacitor 82 having a capacitance value in excess of about 20 microfarads.

In the transmit state, which occurs in the presence of about 3 to 4 milliamps of the d.c. control current, the output of the power amplifier is severed by operation of the break contact 81. Signals generatd by the loudspeaker acting as a microphone, are coupled to the input of the amplifier 67 via the speaker terminal 85, the capacitor 82 and the capacitor 83. As the transistor 79 is off, these signals are amplified by the amplifier 67. The amplified signals are conducted serially through the winding 63 and the variable resistor 68. These signals are inductively coupled to the winding 61 and passed via the diode 65a and the signal terminal 84a. In one example the value of the capacitor 83 is about half of one microfarad. This is sufficiently small so as not to unduly load the output of the power amplifier 66 and sufficiently large to couple speaker originating signals to the input of the amplifier 67 which is typically of relatively high impedance.

What is claimed is:

1. A hands free answer intercom circuit in a key telephone system, the key telephone system including a pair of intercom leads for carrying voice band signals, a signalling lead, and a plurality of key telephone station sets each including loudspeaking means for connection with the signalling lead and a handset for providing voice band communication with others of the plurality of key telephone station sets via the pair of intercom leads; the hands free answer intercom circuit comprising:

a hybrid coupling circuit including a first unidirectional signal path for coupling first a.c. voice band signals from the pair of intercom leads to the signalling lead and a second unidirectional signal path for coupling second a.c. voice band signals from said signalling lead to the pair of intercom leads;

control means for generating a d.c. control signal of alternately first and second predetermined d.c. signal states in said signalling lead, the control means being responsive to the ratio of amplitudes of the first a.c. voice band signals and the second a.c. voice band signals being greater or lesser than a predetermined ratio for generating a corresponding one and the other of first and second d.c. signal states at its output;

whereby the first a.c. voice band signals and the d.c. control signal are provided on the signalling lead for use by one of the key telephone station sets connected thereto.

2. A hands free answer intercom circuit in a key telephone system having a pair of intercom leads, a detector circuit for detecting dialling signals appearing on the pair of intercom leads, a tone signalling generator for generating a plurality of tone signals for application to said pair of intercom leads and to a plurality of signalling leads, a switch matrix for providing a transmission path between the tone signalling generator and a selected one of the plurality of signalling leads in response to detected dialling signals, and a plurality of key telephone station sets each associated with the key telephone system and connectable with said pair of intercom leads, and each having an intercom key, a signalling terminal connected to a respective one of said signalling leads, a loudspeaking means including a loudspeaker and a receive signal path for coupling voice band signals received at its signalling terminal to the loudspeaker; the hands free answer intercom circuit comprising:

in the key telephone system, a hybrid circuit for connection between the pair of intercom leads and a selected one of the plurality of signalling leads, the hybrid circuit including a first unidirectional signal path for coupling first a.c. voice band signals from the pair of intercom leads to the selected signalling lead, a second unidirectional signal path for coupling second a.c. voice band signals from the selected signalling lead to the pair of intercom leads, a control means having inputs connected to the first and second unidirectional signal paths and an output for connection to the selected one of the plurality of signalling leads, the control means being responsive to the ratio of amplitudes of the first a.c. voice band signals and the second a.c. voice band signals being greater or lesser than a predetermined ratio for generating a corresponding one and the other of first and second d.c. signal states at its output, first switch means responsive to operation of a hands free answer key in one of the plurality of key telephone station sets associated with the selected signalling lead for connecting the hybrid circuit; and in at least the last mentioned key telephone station set, a transmit signal path for coupling voice band signals at the loudspeaker to the signalling terminal, and second switch means for alternately connecting one and the other of the transmit and receive signal paths in series between the loudspeaker and the signalling terminal, in response to one and the other of the first and second d.c. signal states being received via the associated signalling lead;

whereby in the instance of said key telephone station set having its hands free answer key depressed and being called by another key telephone station set via said pair of intercom leads, the called key telephone station set is controlled to operate in a hands free intercom mode by said control means.

3. A hands free answer intercom circuit in combination with a station set which includes a receive signal path for coupling voice band signals received at a signal terminal to a loudspeaker for producing corresponding audible tones, the hands free answer intercom circuit comprising:

a transmit signal path for coupling voice band signals at the loudspeaker to the signalling terminal; and switch means for alternately connecting one and the other of the transmit and receive signal paths in series between the loudspeaker and the signal terminal, in response to one and the other of first and second d.c. signal states received at the signal terminal;

whereby the station set is remotely controllable to operate in a hands free receiving mode and in a hands free transmitting mode, providing a hands free answer intercom function.

4. A hands free intercom circuit as defined in claim 3, further comprising:

a restriction circuit for restricting operation of the station set to the hands free receiving mode, the restriction circuit being connected in series with the signal terminal and including an amplifier having an input for receiving signals at the signal terminal and a resistively coupled output connected to the switch means, the amplifier being responsive to a potential difference between the signal terminal and the switch means for generating a signal corresponding to the first d.c. signal state for controlling the switch means to provide the hands free receive mode;

an a.c. signal path bridging the restriction circuit for coupling a.c. voice band signals between the station set and the signal terminal; and a hands free answer key connected across the restriction circuit and actuatable to provide an unrestricted signal path between the signal terminal and the station set whereby the hands free answer intercom function is selected.

5. A hands free answer intercom circuit operable to provide receive and transmit modes of operation between a communication path and a loudspeaker terminal in response to a d.c. control signal provided on said communication path, the d.c. control signal having first and second signal states corresponding to said transmit and receive modes of operation respectively the hands free answer intercom circuit comprising:

a receive path including a power amplifier having a control input, a signal input for receiving a.c. signals from the communication path, and an output for providing amplified signals at the loudspeaker terminal for use in a loudspeaker;

a first switch means, connected to the control input of the power amplifier and responsive to the d.c. control signal being present on the communication path for activating the power amplifier;

a transmit path including a signal amplifier having an input for receiving a.c. signals at the loudspeaker terminal and an output for providing amplified signals for transmission along the communication path;

a second switch means including, a first transmission gate connected in series with the output of the power amplifier, a second transmission gate connected to the input of the signal amplifier, and a current sensitive circuit having an output connected to said first and second transmission gates, and an input connected to receive the control current from the communication path, the current sensitive circuit operating in response to the d.c. control signal being in the second state to change the conductive states of the first and second transmission gates.

6. A hands free answer intercom circuit as defined in claim 5, further comprising:

a restriction circuit for restricting operation of the hands free intercom circuit to the receive mode, the restriction circuit being connected in series with the communication path and including an amplifier having an input for receiving signals from the communication path and an output for providing a signal corresponding to the first signal state in response to a potential difference between the output and the communication path, for controlling the first and second switch means to provide the hands free receive mode;

an a.c. signal path bridging the restriction circuit for coupling a.c. voice band signals from the communication path; and a third switch means connected across the restriction circuit and being actuatable to provide an unrestricted signal path across the restriction circuit.

whereby, in the absence of the d.c. control signal the power amplifier is rendered inactive by the first switch means, and under control of the current sensitive circuit, the first transmission gate provides a signal path between the output of the power amplifier and the speaker terminal and the second transmission gate provides a.c. ground path at the input of the signal amplifier, in the presence of the d.c. control signal the power amplifier is rendered active by the first switch means to provide the receive mode, and in the presence of the d.c. control signal being of the first state, the current sensitive circuit controls the first transmission gate to sever the signal path between the output of the power amplifier and speaker terminal, and controls the second transmission gate to sever the a.c. ground path at the input of the signal amplifier, to provide the transmit mode.

7. A hands free answer intercom circuit as defined in claim 5 further comprising:
   a transformer for coupling a.c. signals between the communication path and the input of the power amplifier, and for coupling a.c. signals between the output of the signal amplifier and the communication path, the transformer including a primary winding and a secondary winding, the secondary winding being connected between the output of the signal amplifier and the input of the power amplifier; and
   a variable resistor connected between ground and the junction of the secondary winding and the input of the power amplifier;
   whereby in the receive mode a.c. signals in the secondary winding are referenced to a.c. ground at the output of the signal amplifier and the variable resistor functions as a volume control in shunt with the input of the power amplifier and in the transmit mode a.c. signals in the secondary winding are referenced to ground via the variable resistor.

8. A hands free intercom circuit for transmitting and receiving a.c. signals between a communication path and a loudspeaker terminal in accordance with a d.c. control signal and comprising:
   a receive amplifier having an input and an output;
   a transmit amplifier having an input and an output;
   a.c. inpedance means connected between the input of the transmit amplifier and the loudspeaker terminal, the value of the impedance means at voice band frequencies being substantially greater than the impedance of the output of the receive amplifier and being substantially less than the impedance of the input of the transmit amplifier;
   a switch means responsive to the d.c. control signal for connecting and disconnecting the output of the receive amplifier with the loudspeaker terminal and correspondingly for connecting and disconnecting the input of the transmit amplifier with a.c. ground to respectiveley provide transmit and recieve modes of operation as determined by the state of the d.c. control signal.

9. A hands free intercom circuit as defined in claim 8 further comprising:
   a transformer for coupling a.c. signals between the transmit and receive amplifier and the communication path, the transformer including a winding connected between the input of the receive amplifier and the output of the transmit amplifier;
   a variable resistance connected between ground and the junction of the input of the receive amplifier and said winding;
   whereby in the receive mode, a.c. ground reference is provided at the output of the transmit amplifier, the variable resistor acting as a volume control in shunt with the input of the receive amplifier, and in the transmit mode ground reference is provided through the variable resistor.

10. A method of operating a key telephone system to provide a hands free answer intercom function by utilizing an intercom lead pair, a signalling path, and a loudspeaker circuit in a called one of a plurality of key telephone station sets in the key telephone system, the method comprising the steps of:
    coupling a.c. signals between the intercom lead pair and the signalling path via a hybrid circuit including first and second unidirection signal paths;
    generating a d.c. control signal having first and second d.c. signal states in the signalling path in response to a ratio of amplitudes of the a.c. signals in the first and second signal paths being greater or lesser than a predetermined ratio;
    operating the loudspeaker circuit in a transmit mode wherein a.c. signals originating in the loudspeaker circuit are transmitted to the intercom lead pair via the signalling path and the hybrid circuit in response to the d.c. control signal being of the first d.c. signal state; and
    operating the loudspeaker circuit in a receive mode wherein a.c. signals from a handset in a calling key telephone station set are transmitted via the intercom lead pair, the hybrid circuit and the signalling path for audible reproduction at the called key telephone station set, in response to the d.c. control signal being of the second d.c. signal state.

* * * * *